Feb. 6, 1962 L. H. SCHALL ETAL 3,020,447
MAGNETRON SYSTEMS
Filed Oct. 27, 1958

INVENTORS
LOUIS H. SCHALL
DONALD L. WINSOR
BY H. Vincent Harsha
ATTORNEY

United States Patent Office 3,020,447

Patented Feb. 6, 1962

3,020,447

MAGNETRON SYSTEMS

Louis H. Schall, Dedham, and Donald L. Winsor, Waltham, Mass., assignors to Raytheon Company, a corporation of Delaware Filed Oct. 27, 1958, Ser. No. 769,745
14 Claims. (Cl. 315—85)

This invention relates to an improved magnetron system, and more particularly, to means including a filter designed to avoid substantial radiation from other than the output coupling means and wherein undesirable amplitude modulation, owing to undesired resonances in the circuit including the magnetron, filter, and lead inductance, is eliminated.

The power supply circuit for magnetron oscillators includes a high voltage transformer, the secondary winding of which is connected between the cathode and anode of the magnetron. In addition, a filament transformer is included for supplying a heater voltage between the magnetron cathode and heater. The power supply transformers and the leads interconnecting the transformers and the magnetron electrodes inherently contain inductance and capacitance; furthermore, capacitance exists between the various windings of the transformer and between the windings and leads to ground. Whenever the anode-to-cathode capacitance of the magnetron forms a series element of a resonant circuit, R.F. power at the resonant frequency or spurious noise will be produced during operation of the magnetron. The inherent capacitance between the anode and cathode of the magnetron in circuit with the aforementioned inductance and capacitive elements forms one or more series resonant circuits which can be excited by the magnetron. In one instance, numerous resonances were discovered ranging from 1 megacycle per second to above 250 megacycles per second. The amount of energy radiated from the magnetron at each of these frequencies will be dependent upon the Q of the resonant circuits. The noise energy radiated in the frequency spectrum up to about 250 megacycles per second has been found to exceed the maximum permissible radiation set by the Federal Communications Commission (35 microvolts per meter measured at 1,000 feet). It is possible of course, to shield the entire system so that the Federal Communications Commission limitation for out-of-band noise is not exceeded. It would be highly impractical and prohibitively expensive to shield all of the noise energy in such a manner so that interference with adjacent electronic equipment would be prevented. It is necessary, however, to shield the magnetron cathode stem to prevent radiation of energy therefrom; moreover, it is essential to control the frequencies at which the magnetron produces undesirable radiation.

An electrically-conductive shielding enclosure, later referred to also as a filter box, is attached at one end to an outer portion of the magnetron, such as the magnetron anode block or cathode pole piece. This shield encloses the cathode-heater stem assembly and precludes radiation of energy from the latter at the normal operating frequency of the magnetron. The portion of the shield opposite that attached to the magnetron may be closed or may contain small perforations which allow egress of cooling air without permitting energy to be radiated from the shield. Cathode and heater leads are each connected to a separate stud which passes through insulating bushings mounted to the side walls of the enclosure. Each stud also extends through a capacitor, one plate of which is the side wall of the enclosure; the capacitor further includes a second condenser plate located within the enclosure and separated from the side wall of the enclosure by a dielectric sheet. An external lead is connected to the inner end of one of the studs and to the cathode connector of the heater cathode stem assembly. Similarly, the inner end of the other stud is connected electrically to the heater by means of a lead within the enclosure attached to the heater connector of the cathode heater stem assembly. One side of each of the aforesaid filter box capacitors is effectively at ground potential, since one plate of the capacitor is made up of the side wall of the enclosure which is grounded to the pole piece or anode block. Consequently, the filter capacitors are effectively in shunt with the external power supply components and leads. In this way, the capacitive and inductive reactance normally presented to the magnetron by the transformer windings and leads is shunted by the filter box capacitors. Since the value of the capacitors of the filter capacitors is relatively high, being of the order of 200 micromicrofarads, the reactance of the filter capacitors predominates and the effect of the reactance of the windings and leads, etc., upon the magnetron circuit becomes negligible. In other words, the external reactance of the power supply components and leads is effectively decoupled from the magnetron by means of the filter box capacitors. The shunting capacitance of the filter capacitors should be located as close to the magnetron cathode as possible. This is not difficult to accomplish, since the filter box capacitor can readily be located close to the cathode heater stem assembly. Because of the filter capacitors, therefore, spurious resonances introduced by the transformer windings and leads are eliminated and much of the undesired noise radiated at frequencies other than the normal or pi mode operating frequency of the magnetron is eliminated. The capacitive reactance of the filter capacitor is sufficiently large to minimize leakage of the rated operating frequency of the system. For reasons that will become apparent subsequently, the capacitance of the filter condenser should not be too large, however, since it would unduly lower the resonant frequency of an undesired resonance about to be described.

There are still a few resonant circuits within the shield which produces spurious resonances; however, only one of these is particularly troublesome. This is the series resonant circuit including one of the filter condensers, the inherent inductance of the cathode lead interconnecting the aforementioned stud and the cathode stem, the inherent inductance in the cathode stem and the capacitance between the anode and cathode of the magnetron. Noise energy generated by the magnetron excites this resonant circuit and causes an R.F. voltage to appear across the anode-to-cathode capacitance of the magnetron at a frequency of about 150 megacycles per second. This voltage not only produces interference energy but also amplitude modulates the magnetron pi mode causing wide bands which are displaced on either side of the pi mode frequency by about 150 megacycles per second. The magnitude of the energy peaks occurring at 150 megacycles, and at 150 megacycles on either side of the pi mode frequency, is such that, even with cathode shielding, the radiation is in excess of that tolerated by the Federal Communications Commission. One approach to the problem of interferences is to shift the frequency at which considerable noise is produced above the operating frequency bands of the electronic equipment subject to said interference. The undesirable energy peaks are removed by shifting the resonance of the aforesaid series resonant circuit from 150 megacycles per second to about 300 megacycles per second. This shift can be obtained if the inductance in the series resonant circuit is decreased. This is achieved by shunting the high inductance magnetron cathode lead within the enclosure with a low inductance element, which may be a thin, flexible metal strap or ribbon, connected, for example, between the stud and the cathode terminal on the cathode heater stem assembly. In other words, the high inductance cathode lead is connected in parallel with a lead of much lower inductance, whereby the inductance of the combination is reduced and the frequency of the energy peak is shifted to a value well outside both the television and radio spectrum.

It is a characteristic of magnetrons that the side bands of the magnetron are harder to excite and are of lower amplitude the higher the side bands lie in the frequency spectrum. If the frequency of the side bands is sufficiently far removed above the pi mode freqeuncy, the side bands may disappear entirely. When the energy peak is shifted from 150 megacycles to 290 megacycles, the magnetron no longer generates any side bands on either side of the rated (pi mode) frequency. It is now clear that the size of the filter condensers should not be too great lest the resonant frequency of the aforesaid series resonant circuit be lowered unduly. In arriving at the choice of value of the capacitance of the filter condensers, a compromise must be made to satisfy the requirement of a capacitance large enough to substantially prevent radiation from the filter box through the filter condensers at the magnetron operating frequency and small enough to avoid series resonance at a value within the frequency spectrum of neighboring equipment, such as radio and television sets. The capacity of the filter box condensers is generally considerably greater than the magnetron anode-to-cathode capacity. For example, the filter box capacity is of the order of 100 micromicrofarads and a typical value of magnetron anode-to-cathode capacity is 20 micromicrofarads.

By means of applicants' invention, therefore, resonant peaks are prevented from occurring in the radio and television band, or are reduced to an inappreciable magnitude. Furthermore, use of band radiation is kept below the maximum value permitted by the Federal Communications Commission and amplitude modulation peaks in the vicinity of the magnetron pi mode are prevented.

Other objects and advantages of this invention will become apparent as the description thereof progresses, reference being had to the accompanying drawing wherein.

Figure 1:
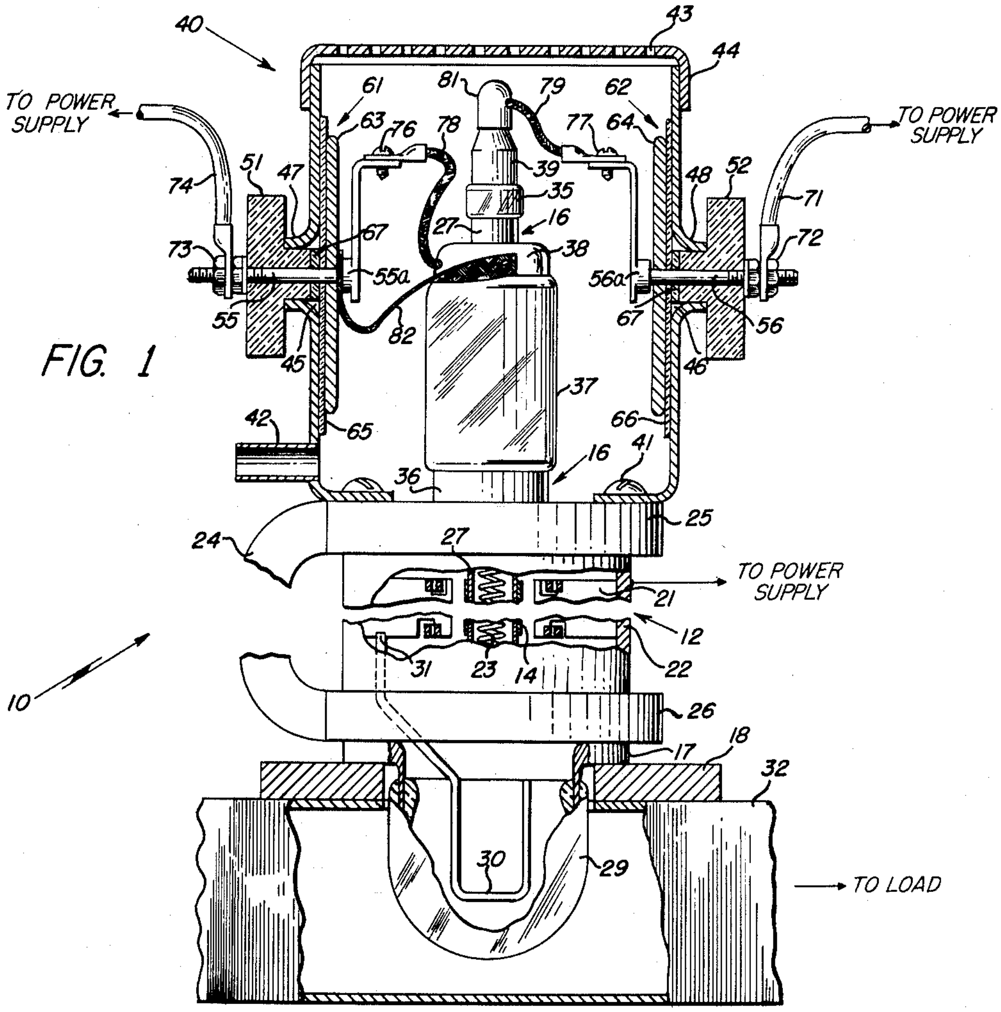
FIG. 1 is a view showing a magnetron incorporating the invention.

Referring to FIG. 1, a magnetron 10 is disclosed which includes an anode structure 12, a cathode 14, a cathode-heater lead-in or stem assembly 16, and a magnetic field-producing means 24. The anode structure 12 includes a plurality of radially disposed anode vanes 21 extending inwardly from a cylindrical outer portion 22; the region bounded by adjacent anode vanes constitutes cavity resonators, as is well known in the art. The cathode 14 is a tubular sleeve supported from the cathode-heater stem assembly 16 and is mounted concentrically with the anode structure. The cathode is provided with an electron-emissive material. A heater 23 is disposed within the cathode 14 to furnish sufficient heat to permit electron emission from the cathode. The cathode is driven negatively with respect to the anode by means of an external power supply and an electric field thereby is established between the magnetron cathode and anode. The magnetic field is produced by a permanent magnet 24 having an upper pole piece 25 hermetically sealed to the anode and a lower pole piece 26 likewise sealed to the anode structure. Electrons emitted from the cathode, under the influence of the electric field between anode and cathode and the magnetic field transverse to the electric field, move past the anode resonator system in such a manner that microwave oscillations are generated. The magnetron includes an output dome 29 made of glass or material transparent to microwave energy. The dome 29 is fused to a metal member 17 which may be secured to pole piece 26. The dome contains a coupling probe 30, which may have more than one finger 31, as shown in FIG. 1. The probe fingers 31 extend into the cavity resonators of the magnetron and may be brazed to the anode vanes. The dome 29 extends into an output waveguide 32 which is closed at one end and coupled to a load at the other end. An annular block 18 serves to support the tube 10 to the waveguide 32. The cathode sleeve 14 is secured to a tubular element 27 of the cathode-heater stem assembly 16—one end of sleeve 27 is fused into a glass bushing 35. The cathode-heater stem assembly 16 includes a tubular element 36 which is supported from the upper pole piece 25; the cathode 14 is electrically insulated from the pole piece 26 by means of a vitreous insulating bushing 37. A metal cathode bushing 38 is fused into the upper end of the vitreous bushing 37 and serves as a means for connecting an appropriate voltage to the cathode. A heater bushing 39 is fused into glass bushing 35 which provides insulation of the heater from the cathode, in addition to mechanical support for the heater.

A metal filter box or shield 40 is attached, as by screws 41, to the upper pole piece 25 of the magnetron and surrounds the cathode-heater stem assembly 16. A conduit 42 may be provided near the bottom of the filter box 40 to permit cooling air for the high voltage cathode bushing 35 and heater bushing 36 to be admitted. Outlets for the cooling air are provided by means of small perforations 43 in the cover 44 of the filter box. These openings effectually constitute irises which are dimensioned so as to be below cut-off dimensions for the normal operating frequency of the magnetron. The openings 42 and 43 for air passage in the filter box 40 may, of course, be omitted, if other provisions are made for cooling.

Opposite sides of the filter box 40 contain apertures 45 and 46 produced, for example, by a punching operation, whereby extruded portions 47 and 48, respectively, of the sides of the box are formed bounding the apertures. Electrical insulating bushings 51 and 52 each have a neck portion mounted within the corresponding extruded portions of the filter box; the bushings 51 and 52 are each centrally apertured to receive electrically conductive studs 55 and 56, respectively, which thereby are insulated from the filter box 40 and, consequently, from the magnetron anode, which generally is grounded. The studs 55 and 56 are effectively grounded at radio frequencies by a pair of high voltage filter condensers 61 and 62, respectively, formed by the side wall of the filter box, corresponding condenser plates 63 and 64 positioned inside the filter box 40 and corresponding dielectric sheets 65 and 66 disposed between the condenser plates and the side wall of the filter box (the other condenser plate). The condenser plates 63 and 64 and dielectric spacers 65 and 66 are apertured to receive the corresponding stud. An electrically insulating washer 67 is inserted between the neck portion of each of the insulating bushings and the corresponding dielectric sheet. The air space bounded by the washer, the neck of the insulating bushing, and the extruded portions of the filter box may be filled with an insulating compound, such as plastic, to further minimize radio frequency leakage from the corresponding apertures 45 and 46. Alternately, the space occupied by the washer may contain this insulating compound. The studs 55 and 56 each includes a head portion **55*a* and 56*a*, respectively, which bears against the respective condenser plates 63 and 64, as well as a threaded portion receptive of a nut 58** which, when tightened against the face of the insulating bushings, provides a tight fitting assembly.

The external power supply lead 71 for the magnetron heater is secured by a nut 72 to stud 56, while the external power supply lead 74 for the cathode is connected to the other stud 55 by a nut 73. Each stud includes a portion extending from the head more or less parallel with the cathode-heater stem assembly and terminating in a bent over portion which is apertured to receive a screw 76, or 77, as the case may be. The vertically extending portion of the stud permits the leads located within the filter box to be mounted conveniently. The magnetron cathode lead 78 inside the filter box 40 is attached at one end to the cathode bushing 38 on the cathode heater stem assembly 16; the other end of this cathode lead 78 is secured by a screw 76 to the stud 55. The magnetron heater lead 79 inside the filter box 40 is fastened at one end to the cap 81 attached to heater bushing 39 on the cathode-heater stem assembly 16, while the other end of the magnetron heater load 79 is attached to the stud 56 by screw 77.

Figure 2:
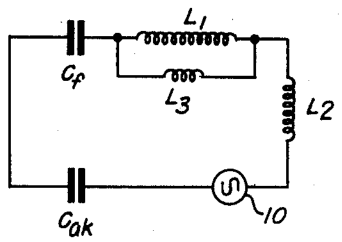
FIG. 2 is an equivalent circuit of a resonant circuit existing in the magnetron system of FIG. 1.

Referring now to FIG. 2, the equivalent series resonant circuit which causes the trouble above-mentioned includes the capacitance $C_f$ of the filter box condenser 61, the inductance $L_1$ of the cathode lead 78, the inductance $L_2$ of the cathode-heater stem assembly 16 and the inherent capacitance $C_{ak}$ existing between the magnetron anode and cathode. The magnetron 10 acts as the generator in this series resonant circuit. As indicated in FIG. 2, the inductance of this series resonant circuit can be lowered, and the resonant frequency increased, by shunting the inductance of the cathode lead 78 with a low inductance lead 82, shown schematically as $L_3$ in FIG. 2. This low inductance lead 82 is shown in FIG. 1 and may be connected between the filter box condenser 61 and the cathode bushing 38. This lead, for example, may be a copper or silver strip about 1½ inches wide and .0005 inch thick. The size and configuration of the strip is subject to some variation, the only limitations being that the strip offers sufficiently small inductance to permit the series resonant frequency of the circuit of FIG. 2 to increase to a value such as to prevent excitation of the resonant circuit within the frequency band of neighboring equipment.

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. In combination, a magnetron-type electron discharge device having an anode, a cathode electrically insulated from said anode and a cathode support assembly, an electrically conductive shield surrounding said support assembly and electrically and mechanically connected to said anode, capacitive means formed by a portion of said shield and a conductive surface disposed parallel thereto, an electrically conductive supply lead passing through said shield and insulated therefrom in the region of said capactive means, a cathode lead disposed within said shield and connected between said supply lead and said cathode, and means for electrically shunting said cathode lead, said shunting means having a low inductance as compared with that of said cathode lead.

2. In combination, a magnetron-type electron discharge device having an anode, a cathode and a cathode support assembly, a power supply circuit for supplying operating voltages to said cathode and said anode, an electrically conductive shield surrounding said support assembly and mechanically and electrically connected to said anode, capacitive means formed by a portion of said shield and a conductive surface disposed parallel thereto, an electrically conductive supply lead connected to said power supply circuit and passing through said shield and insulated therefrom in the region of said capacitive means and in circuit with said capacitive means, said capacitive means presenting substantial reactance to energy at the normal operating frequency of said device and decoupling said power supply circuit from said device, a cathode lead disposed within said shield and connected between said supply lead and said cathode, and means for electrically shunting said cathode lead, said shunting means having a low inductance as compared with that of said cathode lead.

3. In combination, a magnetron-type electron discharge device including a cathode and a cathode support assembly, an electrically conductive shield surrounding said support assembly, capacitive means formed by a portion of said shield and a conductive surface disposed parallel thereto, an electrically conductive supply lead passing through said shield and insulated therefrom in the region of said capacitive means and in circuit with said capacitive means, said capacitive means being of such reactance as to substantially prevent leakage of energy from within said shield through said region at the normal operating frequency of said device.

4. In combination, a magnetron-type electron discharge device including a cathode, and a cathode support assembly, an electrically conductive shield surrounding said support assembly, capacitive means formed by a portion of said shield and a conductive surface disposed parallel thereto, an electrically conductive supply lead passing through said shield and insulated therefrom in the region of said capacitive means and in circuit with said capacitive means, said capacitive means being of such reactance as to substantially prevent leakage of energy from within said shield through said region at the normal operating frequency of said device, a cathode lead disposed within said shield and connected between said supply lead and said cathode, and means for electrically shunting said cathode lead, said shunting means having a low inductance as compared with that of said cathode lead.

5. In combination, a magnetron-type electron discharge device including an anode, a cathode, and a cathode support assembly, said device inherently generating energy at an undesirable frequency owing to a series resonant circuit including the anode-to-cathode capacitance of said device; an electrically conductive enclosure surrounding said support assembly; capacitive means formed by a portion of said enclosure and a conductive surface disposed parallel thereto, a condenser plate within said enclosure and a dielectric layer positioned between said enclosure and said plate; means including an electrically conductive supply lead passing through said enclosure and insulated therefrom in the region of said capactive means and connected to said plate for supplying operating voltages to said device; said capactive means being of relatively high reactance at the normal operating frequency of said device compared with that of the anode-to-cathode capacitance of said device, said capacitive means effectively decoupling said means for supplying from said device and substantially preventing leakage of energy at the normal operating frequency of said device from said enclosure; a cathode lead disposed within said enclosure and connected between said supply lead and said cathode; and means for shifting the frequency of undesired energy generated including means for electrically shunting said cathode lead, said shunting means having an inductance which is low compared with that of said cathode lead.

6. In combination, a magnetron-type electron discharge device having a cathode, and a cathode support assembly, an electrically conductive shield surrounding said support assembly, capacitive means formed by a portion of said shield and a conductive surface disposed parallel thereto, and supply means including an electrically conductive member passing through said shield and insulated therefrom in the region of said capacitive means for supplying operating voltages to said device, said device and said supply means forming resonant circuits productive of undesirable energy in the absence of said capactive means, said capacitive means effectively decoupling the portion of said supply means external to said shield from said device.

7. In combination, a magnetron-type electron discharge device having a cathode, and a cathode support assembly, an electrically conductive shield surrounding said support assembly, capactive means formed by a portion of said shield and a conductive surface disposed parallel thereto, supply means including an electrically conductive member passing through said shield and insulated therefrom in the region of said capacitive means for supplying operating voltages to said device, said device and said supply means forming resonant circuits productive of undesirable energy in the absence of said capacitive means, said capacitive means effectively decoupling the portion of said supply means external to said shield from said device, a cathode lead disposed within said shield and connected between said member and said cathode, and means for electrically shunting said cathode lead, said shunting means having an inductance which is low as compared with that of said cathode lead.

8. In combination, a magnetron-type electron discharge device having a cathode, and a cathode support assembly, an electrically conductive enclosure surrounding said support assembly, a cathode supply lead-in member passing through said enclosure and insulated therefrom, said enclosure being substantially impervious to radiation at the normal operating frequency of said device, a cathode lead disposed within said enclosure and connected between said member and said cathode, and means for electrically shunting said cathode lead with an element having low inductance as compared with that of said cathode lead.

9. In combination, a magnetron-type electron discharge device having an anode, a cathode, and a cathode support assembly, an electrically conductive shield surrounding said support assembly, capacitive means including a portion of said shield and a conductive surface disposed parallel thereto, an electrically conductive member passing through said shield and insulated therefrom in the region of said capacitive means, and in circuit with said capactive means, said cathode and anode, circuit means external to said shield for supplying energy to said cathode and anode, said circuit means being effectively decoupled from said device by said capactive means, a cathode lead disposed within said shield and connected between said member and said cathode, and means for electrically shunting said cathode lead with an element having low inductance as compared with that of said cathode lead.

10. In combination, a magnetron-type electron discharge device having an anode, a cathode, a heater and a cathode-heater support assembly, an electrically conductive enclosure surrounding said support assembly for shielding said support assembly, said enclosure being substantially impervious to radiation at the normal operating frequency of said device, first and second capacitive means each formed by a portion of said enclosure and first and second conductive surfaces disposed parallel to said portions and insulated therefrom, means including first and second electrically conductive supply leads passing through said enclosure and insulated therefrom in the region of the corresponding capacitive means for supplying operating voltages to said device, a cathode lead disposed within said enclosure and connected between one of said supply leads and said cathode, and a heater lead disposed within said enclosure and connected between the other of said supply leads and said heater, 11. In combination, a magnetron-type electron discharge device having an anode, a cathode, a heater and a cathode-heater support assembly, an electrically conductive enclosure surrounding said support assembly for shielding said support assembly, said enclosure being substantially impervious to radiation at the normal operating frequency of said device, first and second capacitive means each formed by a portion of said enclosure and first and second conductive surfaces disposed parallel to said portions and insulated therefrom, supply means including first and second electrically conductive supply members passing through said enclosure in contact with said first and second surfaces, respectively, in the region of the corresponding capacitive means for supplying operating voltages to said device, a cathode lead disposed within said enclosure and connected between one of said supply members and said cathode, a heater lead disposed within said enclosure and connected between the other of said supply members and said heater, and means for electrically shunting at least one of said leads, said shunting means having a low inductance as compared with that of said corresponding lead.

12. An electron discharge device including anode and cathode structures, means supporting said anode and cathode structures in substantially fixed relationship forming a reactance circuit, a power supply and means coupling said power supply to said cathode structure serving to couple D.C. energy thereto and also shield at least a portion of said cathode structure to prevent radiation of energy therefrom comprising a shield enclosing at least a portion of said cathode structure, at least one conductive member disposed within said enclosure in capacitive relationship with said shield, at least one power lead coupled to said power supply passing through said shield and connected to one of said members, means within said enclosure coupling said power leads to said portion of said cathode structure and means electrically shunting said coupling means having substantially lower inductance than said coupling means, the capacitance between said shield and said member and the inductance of said shunting means being such to make the resonant frequency of said circuit beyond the operating frequency band of said device.

13. A device as in claim 12 in which said conductive members are substantially flat and disposed parallel to a portion of said shield in capacitive relationship therewith.

14. A device as in claim 12 in which said electrical shunt has substantially higher resistance than said coupling means.

References Cited in the file of this patent

UNITED STATES PATENTS

| | | |
|---|---|---|
| 1,875,968 | Weeber | Sept. 6, 1932 |
| 1,983,379 | Leach | Dec. 4, 1934 |
| 2,103,362 | Hansell | Dec. 28, 1937 |
| 2,128,237 | Dallenbach | Aug. 30, 1938 |
| 2,208,370 | Johannson | July 16, 1940 |
| 2,378,893 | Berkey et al. | June 26, 1945 |